(12) United States Patent
Stern

(10) Patent No.: US 6,220,746 B1
(45) Date of Patent: *Apr. 24, 2001

(54) AGITATOR APPARATUS

(76) Inventor: Hans J. Stern, Haselweg 1, D-69168 Wiesloch (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,475

(22) Filed: Apr. 29, 1998

(30) Foreign Application Priority Data

| Apr. 30, 1997 | (DE) | 197 18 404 |
| Dec. 11, 1997 | (DE) | 297 21 916 U |
| Feb. 12, 1998 | (DE) | 198 05 592 |

(51) Int. Cl.⁷ .............................. A47J 43/28; G01K 13/00
(52) U.S. Cl. ......................... 366/129; 30/324; 374/141
(58) Field of Search .................... D7/643; 374/157, 374/206, 141, 194; 366/129, 142; 30/141, 142, 324; 73/343

(56) References Cited

U.S. PATENT DOCUMENTS

| 91,843 | * | 6/1869 | Hartshorn | 374/157 |
| D. 217,879 | * | 6/1970 | Biolik | D7/643 |
| D. 235,405 | * | 6/1975 | Brown et al. | D10/46.2 |
| 782,433 | * | 2/1905 | Ashley | 374/157 |
| 856,768 | * | 6/1907 | Comins | 374/157 |
| 2,035,334 | * | 3/1936 | Monrad | 374/157 |
| 2,051,540 | * | 8/1936 | Chaney | 374/194 |
| 2,227,994 | * | 1/1941 | Beck | 374/194 |
| 2,331,227 | * | 10/1943 | Proudlock | 374/157 |
| 3,277,714 | * | 10/1966 | Crandell et al. | 374/157 |
| 3,535,770 | * | 10/1970 | Crandell et al. | 374/157 |
| 3,695,110 | * | 10/1972 | Biolik | 374/157 |
| 4,244,220 | * | 1/1981 | Henson et al. | 374/141 |
| 5,575,563 | * | 11/1996 | Chiu et al. | 374/141 |

FOREIGN PATENT DOCUMENTS

| 3636173 | 5/1988 | (DE) . |
| 3722822 | 1/1989 | (DE) . |
| 3741148 | 6/1989 | (DE) . |
| 840146 | 9/1994 | (DE) . |
| 29600542 U | 3/1997 | (DE) . |
| 2247184 | 5/1975 | (FR) . |
| 08089424A | 4/1996 | (JP) . |

* cited by examiner

*Primary Examiner*—Tony G. Soohoo
(74) *Attorney, Agent, or Firm*—Venable; George H. Spencer; Robert Kinberg

(57) ABSTRACT

For the purpose of a simple and yet functionally dependable design of the temperature detection, an agitator apparatus, in particular a cooking spoon, with a handle (1), a spoon element (2) and a shaft (3) connecting the handle (1) with the spoon element (2), wherein a temperature sensor (54) is associated with the spoon element (2) and a temperature indicator (5) with the handle (1), is distinguished in that a heat-conducting and/or liquid-conducting connection (6) exists via a viscous mass (9) is disposed between the temperature sensor (4) and the temperature indicator (5).

20 Claims, 1 Drawing Sheet

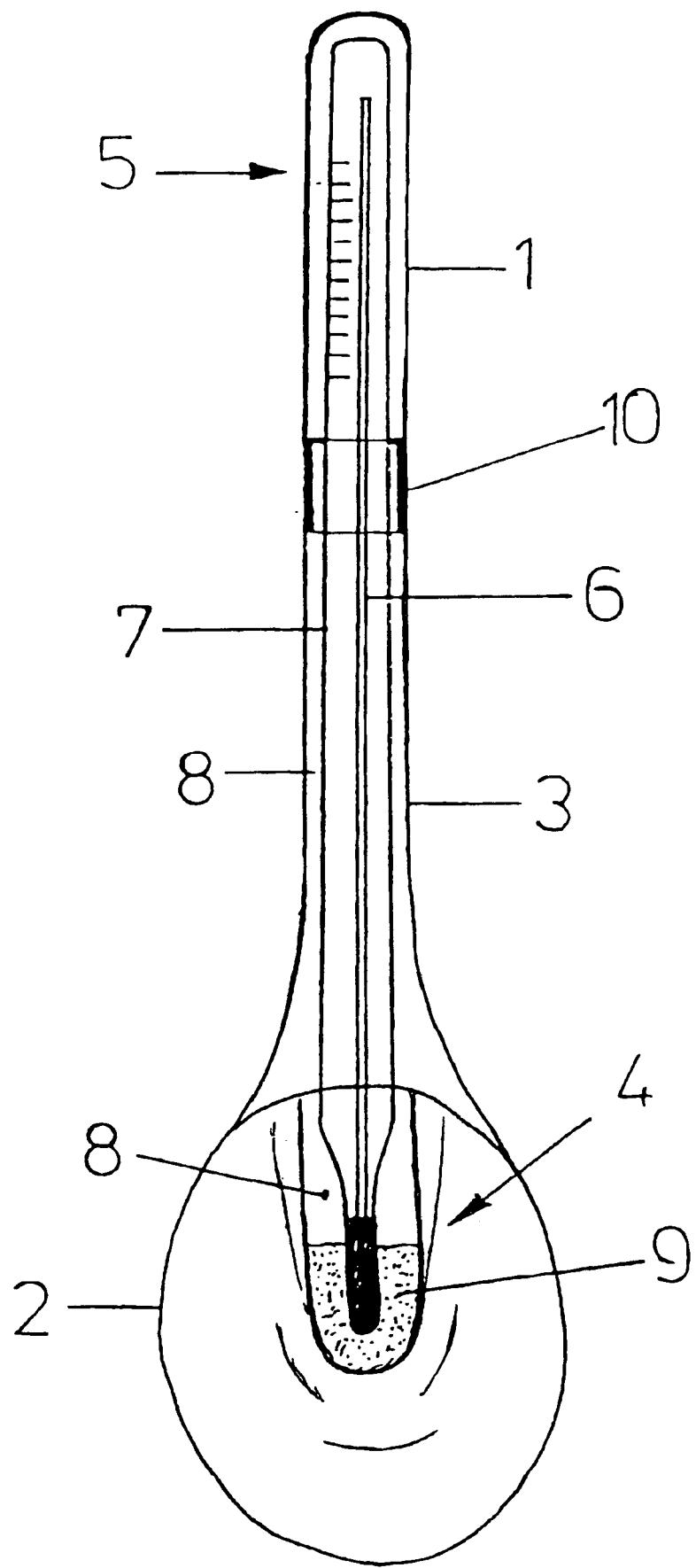

AGITATOR APPARATUS

BACKGROUND OF THE INVENTION

The invention relates to an agitator apparatus, in particular a cooking spoon, with a handle, a spoon element and a shaft connecting the handle with the spoon element, wherein a temperature sensor is associated with the spoon element and a temperature indicator with the handle.

In actual use, agitator apparatus, or respectively cooking spoons, of the type addressed here have been known for a considerable time. Reference is made merely by way of example to DE 36 36 173 A1. Such an agitator apparatus is known from this reference, wherein a temperature sensor with a temperature indicator arrangement is integrated into the agitator apparatus. The temperature indicator arrangement comprises an electronic measuring device, wherein the temperature sensor is designed as a high-temperature thermistor.

The known agitator apparatus is structurally elaborate, not the least because of the required electronic components. Further than that, the known agitator apparatus does not permit the exchange of the temperature sensor and/or the temperature indicator. If the temperature sensor is damaged there, the agitator apparatus is no longer able to function in respect to temperature measurements.

SUMMARY OF THE INVENTION

It is therefore the object of the instant invention to design an agitator apparatus of the type which constitutes the species simply and at the same time functionally dependably.

The above object is attained preferably by a device with the following characteristics: a handle with a spoon element having a hollow for receiving a temperature sensor; a shaft connecting the handle with the spoon element, the shaft having a coupling for connecting the shaft to the handle; an enclosed conduit extending therethrough, the conduit being constructed and arranged to extend into the hollow of the spoon element and into the handle and to removably hold a thermometer; the thermometer comprising a temperature sensor and a temperature indicator wherein the temperature indicator of the thermometer is disposed within the handle and the temperature-sensor of the thermometer is disposed within the hollow in the spoon element so that a heat-conducting or liquid-conducting connection exists between the temperature sensor and the temperature indicator and a heat-conducting medium provided in the hollow for conducting heat to the temperature sensor and for receiving and removably fixing in place the temperature sensor of the thermometer wherein the heat-conducting medium is a viscous mass into which the temperature sensor of the thermometer is disposed. In accordance therewith the agitator apparatus constituting the species is distinguished in that a heat-conducting and/or liquid-conducting connection is provided between the temperature sensor and the temperature indicator.

A temperature indicator has been selected here in accordance with the invention which is directly connected with the temperature sensor, both in a heat-conducting and/or liquid-conducting manner. In this respect the detected heat is indicated by means of conventional heat-conducting and/or liquid-conducting thermometers, wherein an analog indicator is particularly suitable here.

In an advantageous manner the temperature sensor and the temperature indicator are components of a commercially available thermometer built into the agitator apparatus. This thermometer can be an expansion, or respectively liquid expansion thermometer.

In connection with its construction it is of a very particular advantage if the shaft has a conduit extending into the spoon element, into which the thermometer with the temperature sensor is inserted. The conduit could extend to approximately the middle of the spoon element. However, it is also conceivable in the same way that the conduit extends as far as the frontal area of the spoon element, namely for assuring dependable temperature detection even in the lower spoon area.

To prevent heat insulation, or respectively to obtain a sufficiently good heat transfer between the spoon element and the temperature sensor, it is of particularly great advantage if a heat-conducting medium for receiving and fixing in place the temperature-sensing end of the thermometer, i.e. the temperature sensor, is provided in the lower end of the conduit. At last the thermometer is inserted with its free end into the heat-conducting medium, so that a sufficiently good heat transfer to the inner wall of the conduit and thus to the spoon element is assured. The heat-conducting medium furthermore is used for fixing the thermometer in place, so that the unintentional slippage or displacement of the thermometer inside the agitating apparatus is effectively prevented.

Within the scope of a particularly advantageous embodiment of the agitator apparatus, in particular in view of simple repair, the thermometer could be removable from the conduit. In this respect the heat-conducting material is a viscous mass, for example a modeling clay-like heat-conducting material, out of which the thermometer with its temperature sensor can be pulled. The exchangeability of the thermometer is assured by this.

It is also possible in the same way, particularly within the scope of a particularly simple embodiment of the claimed teaching, to glue the thermometer into the conduit, at least with its temperature-sensing end. Even when using an adhesive, the thermometer could easily be exchangeable, namely if the adhesive does not harden completely. Careful pulling on the thermometer would allow it to be removed from the conduit and thereby exchanged.

The spoon itself could be made of a heat-conducting material. The spoon element, or respectively the heat-conducting material, could be a metal. In view of the esthetics resulting from the shape of the agitator apparatus, it is advantageous if the spoon element consists of brushed special steel, for example. In this respect an ideal heat conduction would be assured. The spoon element could be attached to the shaft, wherein the shaft itself could be made of wood, plastic or also of metal.

However, the heat-conducting material of the spoon element could just as well be a heat-conducting plastic material, so that the spoon element along with the shaft could be made in one piece of plastic. Such an embodiment is particularly advantageous in view of the manufacture of the spoon element along with the shaft, namely since these two areas of the agitator apparatus could be produced by injection molding. Here the manufacturing costs are most likely the lowest.

Regarding the temperature indicator which, when a thermometer is used, can be the upper part of the thermometer, it is of advantage in view of suitable readability if this upper portion of the thermometer projects out of the shaft. Now, to fix the thermometer in place also in the upper area of the shaft, further means for fixing the thermometer in place could be provided on the free end of the shaft inside the conduit there. Within the scope of a particularly simple embodiment this could be an O-ring placed around the thermometer, which is quasi pressed between the inner wall of the shaft and the outer wall of the thermometer. In this respect the thermometer would be arranged coaxially in the conduit, wherein an unintentional positional change of the thermometer is effectively prevented.

For protecting the thermometer, in particular the integrated temperature indicator, the upper portion of the thermometer could be enclosed in a transparent envelope, wherein here this can also be a—transparent—envelope made of plastic with sufficient rigidity. This transparent envelope could be embodied the same as the shaft itself and could extend the shaft when it is placed on it there. Correspondingly the transparent envelope—as the shaft extension—could constitute the handle element, or respectively the handle.

It is now essential that the handle can be inserted into the shaft or placed on the shaft and—for exchanging the thermometer—can again be removed from the shaft. Corresponding to the conduit embodied in the shaft, the handle would also have a conduit into which the portion of the thermometer containing the temperature indicator preferably fits with only little play. In this case the conduit could be embodied in such a way that the portion of the thermometer containing the temperature indicator is fixed in place—by the conduit itself—in its position inside the handle. It is conceivable in the same way that the thermometer has an O-ring or the like in the area of the temperature indicator, which can be pushed, or respectively pressed, between the outer surface of the thermometer and the inner surface of the conduit.

In order to prevent the thermometer from coming into contact directly with the liquid, in particular to prevent the penetration of liquid into the conduit inside the agitator apparatus, sealing means are provided between the handle and the shaft. In this way, the connecting element of the handle for example, which can be inserted into the shaft, could have sealing means, which can also be an O-ring placed around the connecting element. On the one hand, this O-ring would have a sealing effect, and on the other hand the effect of fixing the connecting element in place inside the shaft. Only after overcoming the pressure force occurring in this connection, could the handle be removed from the shaft, or respectively pulled out of the shaft.

However, for a secure connection between the handle and the shaft it is also conceivable to glue the two elements together, wherein this can be a permanently elastic adhesive. The adhesive joint could be torn open with a suitable rotating movement and corresponding force effect, so that in this respect the removal of the handle and therefore the exchangeability of the thermometer is assured.

Now there are different possibilities of embodying and further developing the teaching of the instant invention in an advantageous manner. To this end, reference is made on the one hand to the claims which are subordinate to claim 1, and on the other hand to the following explanation of an exemplary embodiment of the invention, making reference to the drawings. In connection with the explanation of the preferred embodiment of the invention by means of the drawings, generally preferred embodiments and further developments of the teaching will be explained.

BRIEF DESCRIPTION OF THE DRAWING

The single drawing FIGURE represents an exemplary embodiment of an agitator apparatus in accordance with the invention in a schematic view, wherein the representation of individual details has been omitted for reasons of simplicity and clarity.

DETAILED DESCRIPTION

In accordance with the single drawing FIGURE, the agitator apparatus is a cooking spoon, comprising a handle 1, a spoon element 2 and a shaft 3 connecting the handle 1 with the spoon element 2. The single drawing FIGURE furthermore shows that a temperature sensor 4 is assigned to the spoon element 2 and a temperature indicator 5 to the handle 1.

In accordance with the invention, a liquid-conducting connection 6 is provided between the temperature sensor 4 and the temperature indicator 5.

In the exemplary embodiment represented in the single drawing FIGURE the temperature sensor 4 and the temperature indicator 5 are components of a built-in thermometer 7, which in this case is a liquid expansion thermometer.

The shaft 3 has a conduit 8 extending to approximately the middle of the spoon element 2, into which the thermometer 7 has been inserted. A heat-conducting medium 9 for receiving and fixing in place the temperature-sensing free end, or respectively the temperature sensor 4 of the thermometer 7 is provided in the lower end of the conduit 8. In this case the heat conducting medium 9 is a permanently elastic mass, so that the thermometer 7 can be easily removed again from the conduit 8.

The spoon element 2 is made of a heat-conducting material, namely a heat-conducting plastic material.

The upper portion of the thermometer 7 with the temperature indicator 5 projects upwardly out of the shaft 3. A transparent envelope is arranged around the temperature indicator 5, which constitutes the handle 1, or respectively the handle element. In this case the handle 1 is inserted with a connecting area 10 into the shaft 3.

In order to prevent repetitions, reference regarding further details is made to the general part of the specification. Further details are not shown here for the sake of a clear representation.

In conclusion it should be stressed that the above exemplary embodiment, only mentioned by way of example, explains the teachings of the invention, but does not limit the latter to the exemplary embodiment.

What is claimed is:

1. An agitator apparatus in the form of a cooking spoon comprising:
   (a) a handle,
   (b) a spoon element having a hollow for receiving a temperature sensor,
   (c) a shaft connecting the handle with the spoon element, the shaft having a coupling for connecting the shaft to the handle,
   (d) an enclosed conduit extending therethrough, the conduit being constructed and arranged to extend into the hollow of the spoon element and into the handle and to removably hold a thermometer
   (e) the thermometer comprising a temperature sensor and a temperature indicator wherein the temperature indicator of the thermometer is disposed within the handle and the temperature-sensor of the thermometer is disposed within the hollow in the spoon element so that a heat-conducting or liquid-conducting connection exists between the temperature sensor and the temperature indicator, and (f) a heat-conducting medium provided in the hollow for conducting heat to the temperature sensor and for receiving and removably fixing in place the temperature sensor of the thermometer wherein the heat-conducting medium is a viscous mass into which the temperature sensor of the thermometer is disposed.

2. An agitator apparatus according to claim 1, wherein the hollow extends to about the center of the spoon element.

3. An agitator apparatus according to claim 1, wherein the conduit extends into the frontal area of the spoon element.

4. An agitator apparatus according to claim 1, wherein the thermometer can be removed from the conduit.

5. An agitator apparatus according to claim 1, characterized in that the spoon element comprises a heat-conducting material.

6. An agitator apparatus according to claim 5, wherein the heat-conducting material comprises metal.

7. An agitator apparatus according to claim 5, wherein the heat-conducting material comprises heat-conducting plastic.

8. An agitator apparatus according to claim 5, wherein the temperature indicator portion of the thermometer is enclosed in a transparent envelope.

9. An agitator apparatus according to claim 1, wherein at least a portion of the temperature indicator portion of the thermometer projects from the shaft.

10. An agitator apparatus according to claim 9, wherein further means for fixing the thermometer are provided inside the conduit in the portion of the shaft distant from the spoon element.

11. An agitator apparatus according to claim 10, wherein the further means for fixing the thermometer in place is an O-ring disposed around the thermometer and within the conduit.

12. An agitator apparatus according to claim 10, wherein the handle can be removably inserted into the shaft to facilitate removal or insertion of the thermometer.

13. An agitator apparatus according to claim 12, further comprising sealing means disposed within the coupling for sealing the thermometer to the conduit such that fluids to be measured are prevented from reaching the handle or temperature indicator.

14. An agitator apparatus according to claim 13, wherein the sealing means is an O-ring disposed within the coupling.

15. An agitator apparatus according to claim 10, wherein the relative dimensions of the conduit are constructed and arranged so that temperature indicator of the thermometer fits snugly.

16. An agitator apparatus according to claim 9, wherein the transparent envelope extends from the shaft to form the handle.

17. An agitator apparatus according to claim 9, wherein the temperature indicator of the thermometer is fixed in position inside the handle.

18. An agitator apparatus according to claim 1, wherein the handle and the shaft are glued together with a glue which permits demountable attachment of the handle from the shaft.

19. An agitator apparatus in the form of a cooking spoon comprising:
(a) a handle;
(b) a spoon element having a bowl;
(c) a hollow shaft connecting the handle to the spoon element and forming a conduit from the handle to the bowl of the spoon;
(e) a thermometer removably disposed within the conduit and comprising a temperature sensor and a temperature indicator connected with the temperature sensor by one of a heat-conducting and a liquid-conducting connection, wherein the temperature-sensor of the thermometer is disposed within the bowl of the spoon element; and
(f) a viscous, heat-conducting medium removably fixing the temperature sensor of the thermometer in the bowl of the spoon element, and thereby removably fixing the thermometer in the apparatus.

20. The agitator apparatus of claim 19, wherein the heat-conducting medium is viscous within the operating temperature of the apparatus.

* * * * *